US012418138B2

(12) United States Patent
Li et al.

(10) Patent No.: US 12,418,138 B2

(45) Date of Patent: Sep. 16, 2025

(54) ELECTRICAL CONNECTOR WITH WATERPROOF MEMBER THEREIN

(71) Applicant: Advanced Connectek Inc., New Taipei (TW)

(72) Inventors: Yubin Li, New Taipei (TW); Yao Mei Wang, New Taipei (TW); Guan Liao, New Taipei (TW); Pin-Yuan Hou, New Taipei (TW); Shu-Fen Wang, New Taipei (TW)

(73) Assignee: Advanced Connectek Inc., New Taipei (TW)

( * ) Notice: Subject to any disclaimer, the term of this patent is extended or adjusted under 35 U.S.C. 154(b) by 450 days.

(21) Appl. No.: 17/993,876

(22) Filed: Nov. 24, 2022

(65) Prior Publication Data

US 2023/0170646 A1 Jun. 1, 2023

(30) Foreign Application Priority Data

Nov. 26, 2021 (CN) ......................... 202111420123.7

(51) Int. Cl.

*H01R 13/52* (2006.01)
*H01R 4/02* (2006.01)
*H01R 13/502* (2006.01)
*H01R 24/60* (2011.01)

(52) U.S. Cl.

CPC ......... *H01R 13/5216* (2013.01); *H01R 4/023* (2013.01); *H01R 13/502* (2013.01); *H01R 24/60* (2013.01)

(58) Field of Classification Search

CPC .............. H01R 13/5216; H01R 13/523; H01R 13/502; H01R 24/60

USPC ......................................... 439/519, 520, 521

See application file for complete search history.

(56) References Cited

U.S. PATENT DOCUMENTS

| | | | | |
|---|---|---|---|---|
| 9,761,988 B1 * | 9/2017 | Lin | .................... | H01R 13/5216 |
| 9,899,779 B1 * | 2/2018 | Lin | .................... | H01R 13/5202 |
| 12,088,032 B2 * | 9/2024 | Yang | .................... | H01R 13/405 |
| 2018/0097298 A1 * | 4/2018 | Ju | ....................... | H01R 13/6591 |
| 2021/0111508 A1 * | 4/2021 | Gu | ....................... | H01R 43/005 |

* cited by examiner

*Primary Examiner* — Abdullah A Riyami
*Assistant Examiner* — Amara Anderson
(74) *Attorney, Agent, or Firm* — JCIPRNET

(57) ABSTRACT

An electrical connector including a plurality of terminals, a first insulating body, a second insulating body, a shell, and a waterproof member is provided. The terminals are respectively retained in the first insulating body and the second insulating body. The shell is sheathed to the first insulating body and the second insulating body. The shell has a front edge and a rear edge opposite to each other along an insertion direction. The front edge is used for mating another electrical connector. At least one opening is formed by the rear edge and the second insulating body. The first insulating body and the second insulating body are separated from each other. A space is formed by the first insulating body, the second insulating body, and the shell. The space is communicated with an external environment via the at least one opening. The waterproof member is filled into the space.

17 Claims, 6 Drawing Sheets

100

ELECTRICAL CONNECTOR WITH WATERPROOF MEMBER THEREIN

CROSS-REFERENCE TO RELATED APPLICATION

This application claims the priority benefit of China application serial no. 202111420123.7, filed on Nov. 26, 2021. The entirety of the above-mentioned patent application is hereby incorporated by reference herein and made a part of this specification.

BACKGROUND OF THE INVENTION

Field of the Invention

The invention relates to an electrical connector.

Description of Related Art

The waterproof effect of the existing electrical connector products mostly adopts external sealing. That is, a waterproof rubber ring is disposed between the electrical connector and the body of the applied product in order to prevent water from entering the body from the external environment from the seam between the electrical connector and the body.

As mentioned above, the prior art does not provide any waterproof means for the internal structure of the electrical connector. For example, generally, when the electrical connector is combined with the internal circuit board of the body, it is often necessary to solder the two at high temperature. At this time, the insulating bodies and the terminals of the electrical connector are readily deformed in different manners due to the difference in specific heat, thereby generating a gap. As a result, if the waterproof mechanism of the internal structure of the electrical connector is neglected, water from the external environment readily enters the electrical connector, such that the waterproof effect is lost.

SUMMARY OF THE INVENTION

The invention provides an electrical connector that provides a corresponding waterproof mechanism from the internal structure of the electrical connector, and particularly provides a waterproof mechanism between insulating bodies and terminals.

An electrical connector of the invention includes a plurality of terminals, a first insulating body, a second insulating body, a shell, and a waterproof member. The terminals are respectively retained in the first insulating body and the second insulating body. The shell is sheathed to the first insulating body and the second insulating body. The shell has a front edge and a rear edge opposite to each other along an insertion direction. The front edge is used for mating another electrical connector. At least one opening is formed by the rear edge and the second insulating body. The first insulating body and the second insulating body are separated from each other. A space is formed by the first insulating body, the second insulating body, and the shell. The space is communicated with an external environment via the at least one opening. The waterproof member is filled into the space.

An electrical connector of the invention includes a plurality of terminals, a first insulating body, a second insulating body, a shell, and a waterproof member. The terminals are respectively retained in the first insulating body and the second insulating body along an insertion direction. A gap is between the first insulating body and the second insulating body, and a part of each terminals is exposed in the gap.

Preferably, the waterproof member is a waterproof adhesive injected through the at least one opening and filled in the space.

Preferably, the waterproof member is a waterproof adhesive injected via the at least one opening and fully filled in the space and the gap to enclose the exposed part of each terminal.

Preferably, at least one of the rear edge and the second insulating body has at least one notch at a portion where the rear edge and the second insulating body are adjacent to each other to form the at least one opening.

Preferably, the second insulating body has an inclined surface inclined from the at least one opening toward the space.

Preferably, the first insulating body is disposed in the shell and located between the front edge and the rear edge.

Preferably, the first insulating body has a first base portion and a tongue portion, the first base portion is abutted against a retaining wall in the shell, the tongue portion passes through and is protruded beyond the shell, and the first base portion is located between the tongue portion and the second insulating body.

Preferably, each of the plurality of terminals has a contact portion for mating with the other electrical connector. The contact portion exposes the first insulating body from the tongue portion.

Preferably, the second insulating body has a second base portion and a tail portion, the first base portion and the second base portion maintain a gap along the insertion direction, and the second base portion is located between the first base portion and the tail portion.

Preferably, each of the plurality of terminals has a soldering portion for soldering on a circuit board, and the soldering portion exposes the second insulating body from the tail portion.

Preferably, the second base portion and the rear edge of the shell are adjacent to each other and the at least one opening is therebetween.

Preferably, the second base portion is seated on a plane, and the insertion direction is a normal of the plane. An orthographic projection area of the waterproof member on the plane is less than that of the second base portion, so that the waterproof member is shielded by the second base portion in the insertion direction.

Preferably, the at least one opening includes a plurality of openings disposed around the insertion direction.

Based on the above, the electrical connector is respectively combined to the terminals via the first insulating body and the second insulating body separated from each other, so as to allow the shell, the first insulating body, and the second insulating body to form the space and allow the second insulating body and the rear edge of the shell to form the opening and further allow the space to be communicated with the external environment via the opening when the shell is sheathed on the first insulating body and the second insulating body. In this way, when the waterproof member is filled in the space, it is equivalent to having the waterproof member form a waterproof structure between the shell, the first insulating body, and the second insulating body separated from each other. In addition to the waterproof mechanism between the shell and the first insulating body and the second insulating body, even if there is a gap between the terminals and the insulating bodies for the above reasons, the gap may still be effectively blocked. That is, a perfect waterproof mechanism is provided from the internal structure of the electrical connector.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
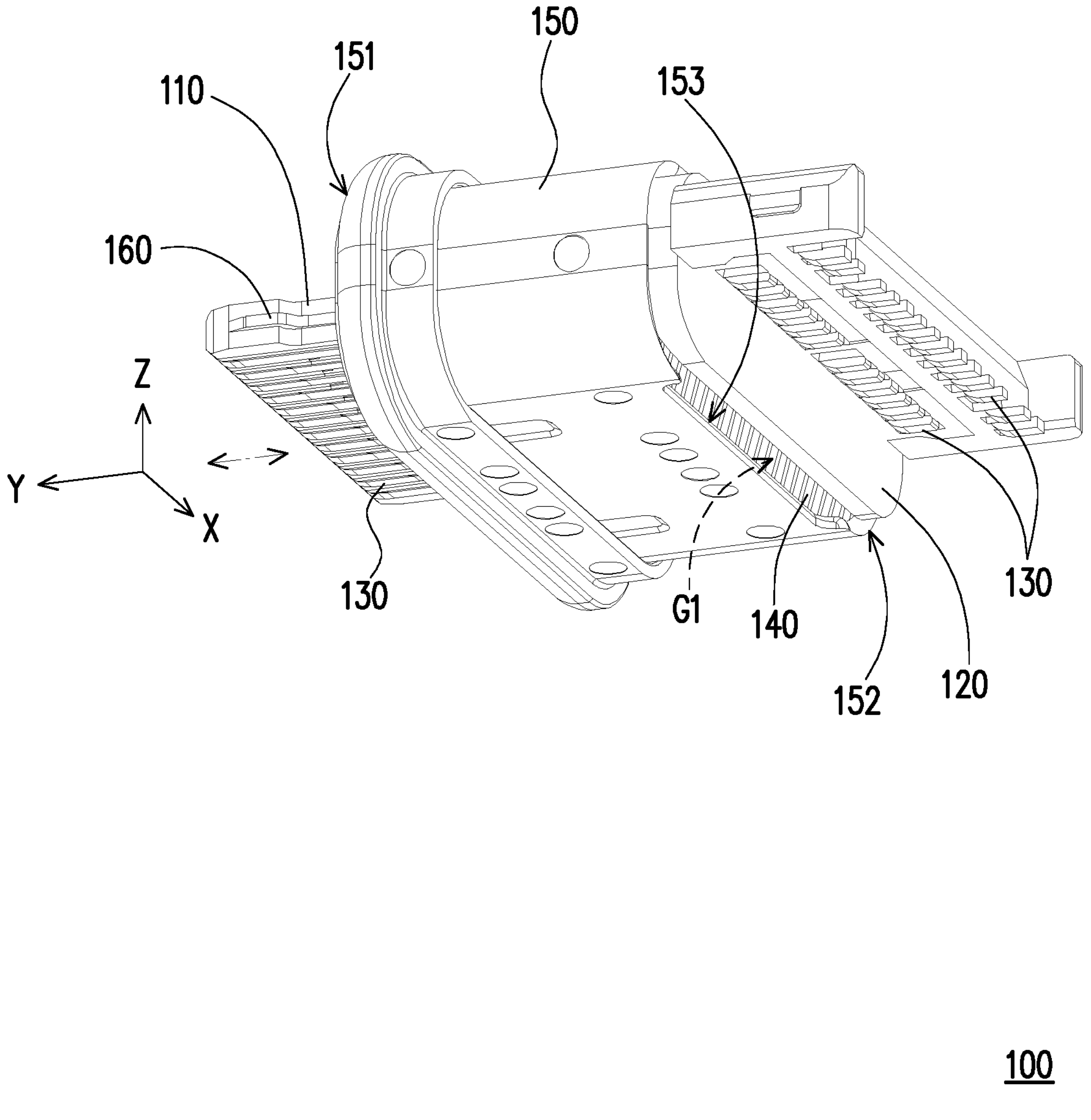
FIG. 1 is a schematic diagram of an electrical connector according to an embodiment of the invention.
Figure 2:
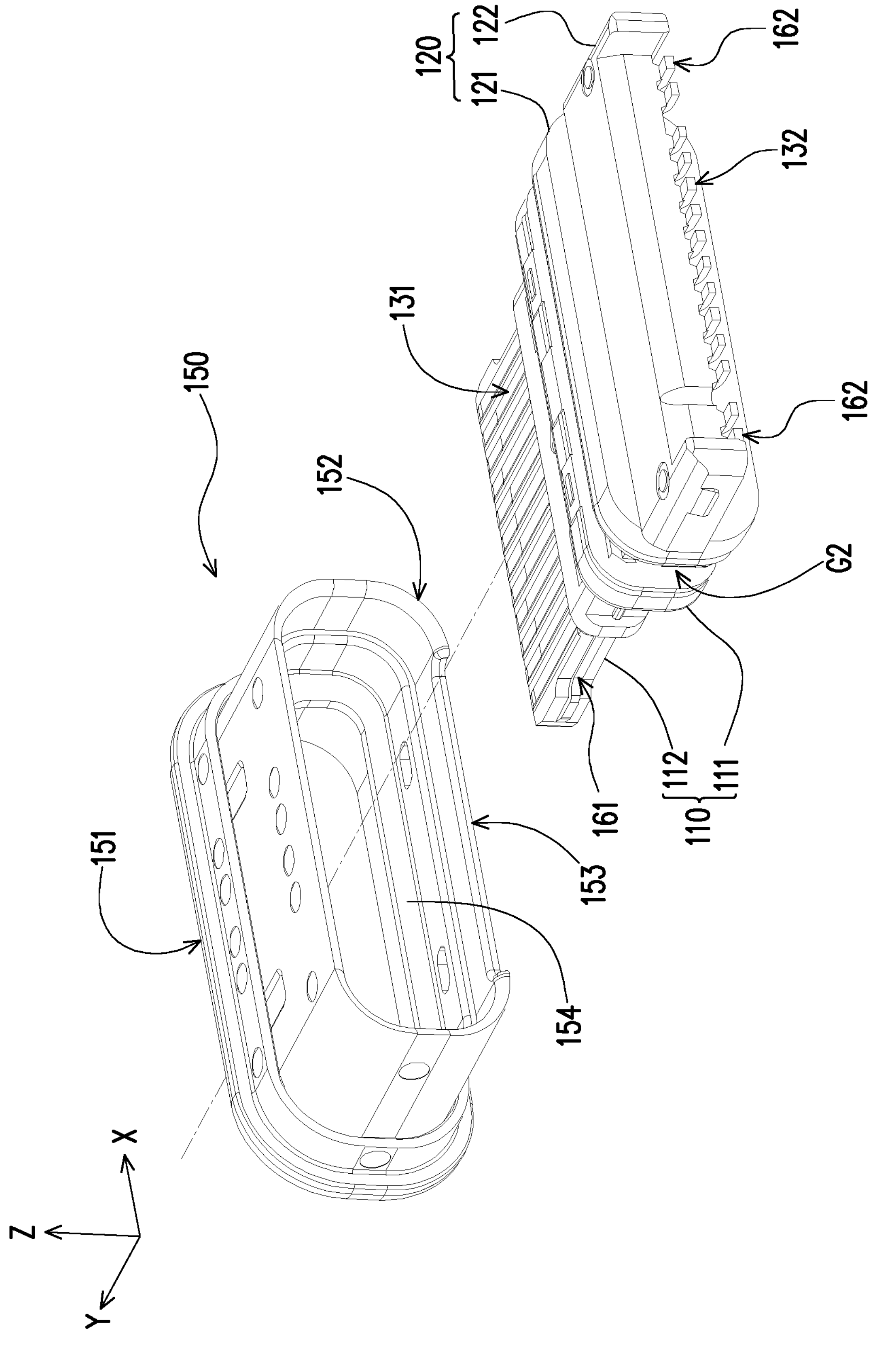
FIG. 2 is an exploded view of the electrical connector of FIG. 1.
Figure 3:
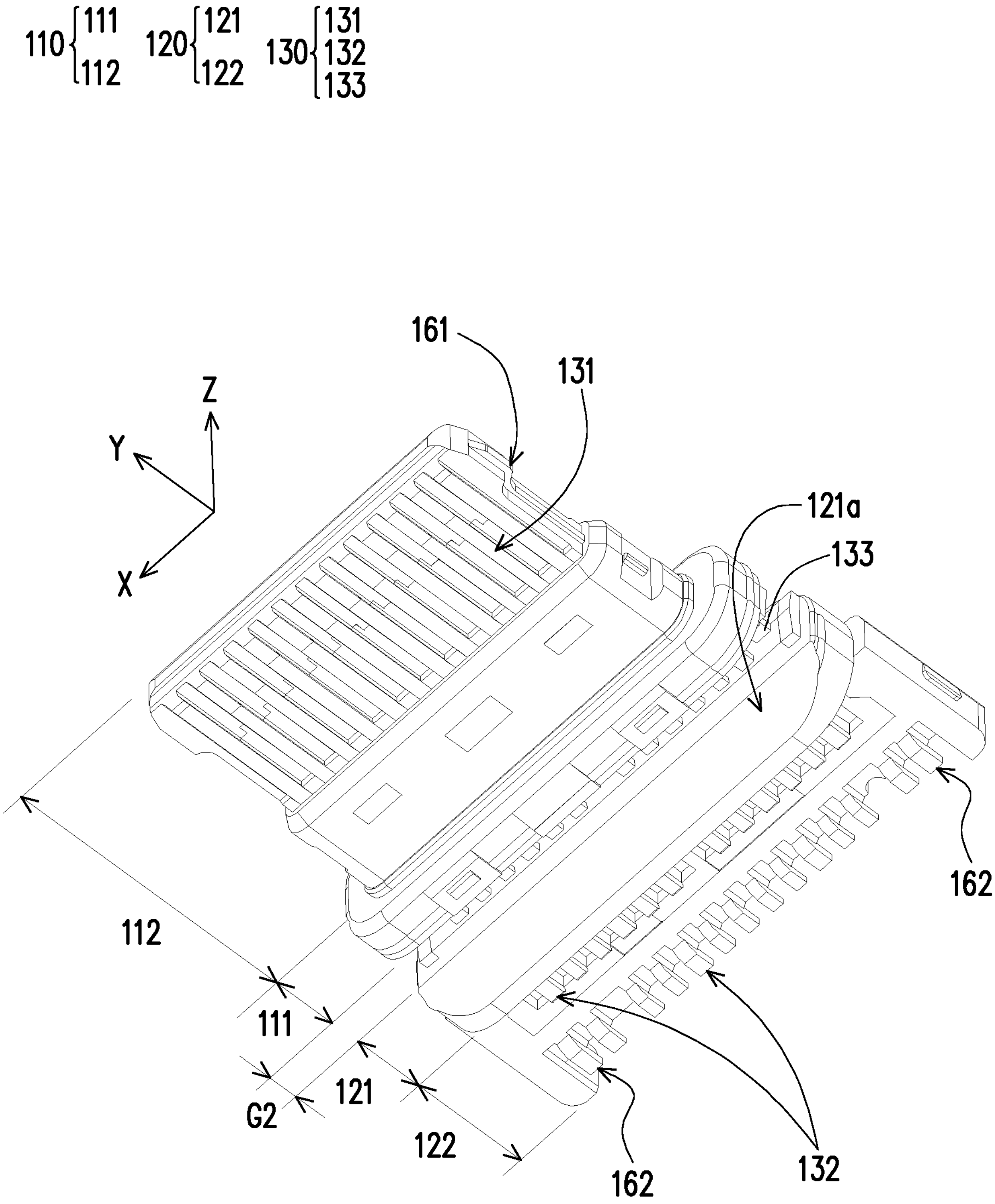
FIG. 3 shows some members of FIG. 2 from another perspective.

FIG. 1 is a schematic diagram of an electrical connector according to an embodiment of the invention. FIG. 2 is an exploded view of the electrical connector of FIG. 1. FIG. 3 shows some members of FIG. 2 from another perspective. Cartesian coordinates X-Y-Z are also provided here to facilitate member description. Referring to all of FIG. 1 to FIG. 3, in the present embodiment, an electrical connector 100 is used for mating with another electrical connector (not shown) along an insertion direction (double arrows shown in FIG. 1). As shown in FIG. 1, and the electrical connector 100 of the present embodiment is mated to the other electrical connector along the Y-axis, and the Y-axis is the insertion direction of the electrical connector 100.

The electrical connector 100 includes a plurality of terminals 130, a first insulating body 110, a second insulating body 120, a shell 150, and a waterproof member 140. The first insulating body 110 and the second insulating body 120 are respectively combined to the terminals 130. In other words, there exists a gap or a spacing G2 between the first insulating body 110 and the second insulating body 120. The shell 150 is sheathed on the first insulating body 110 and the second insulating body 120. The shell 150 has a front edge 151 and a rear edge 152 opposite to each other along the insertion direction. The front edge 151 is used for mating with another electrical connector, and the rear edge 152 and the second insulating body 120 form at least one opening G1. The first insulating body 110 and the second insulating body 120 are separated from each other.

Figure 4:
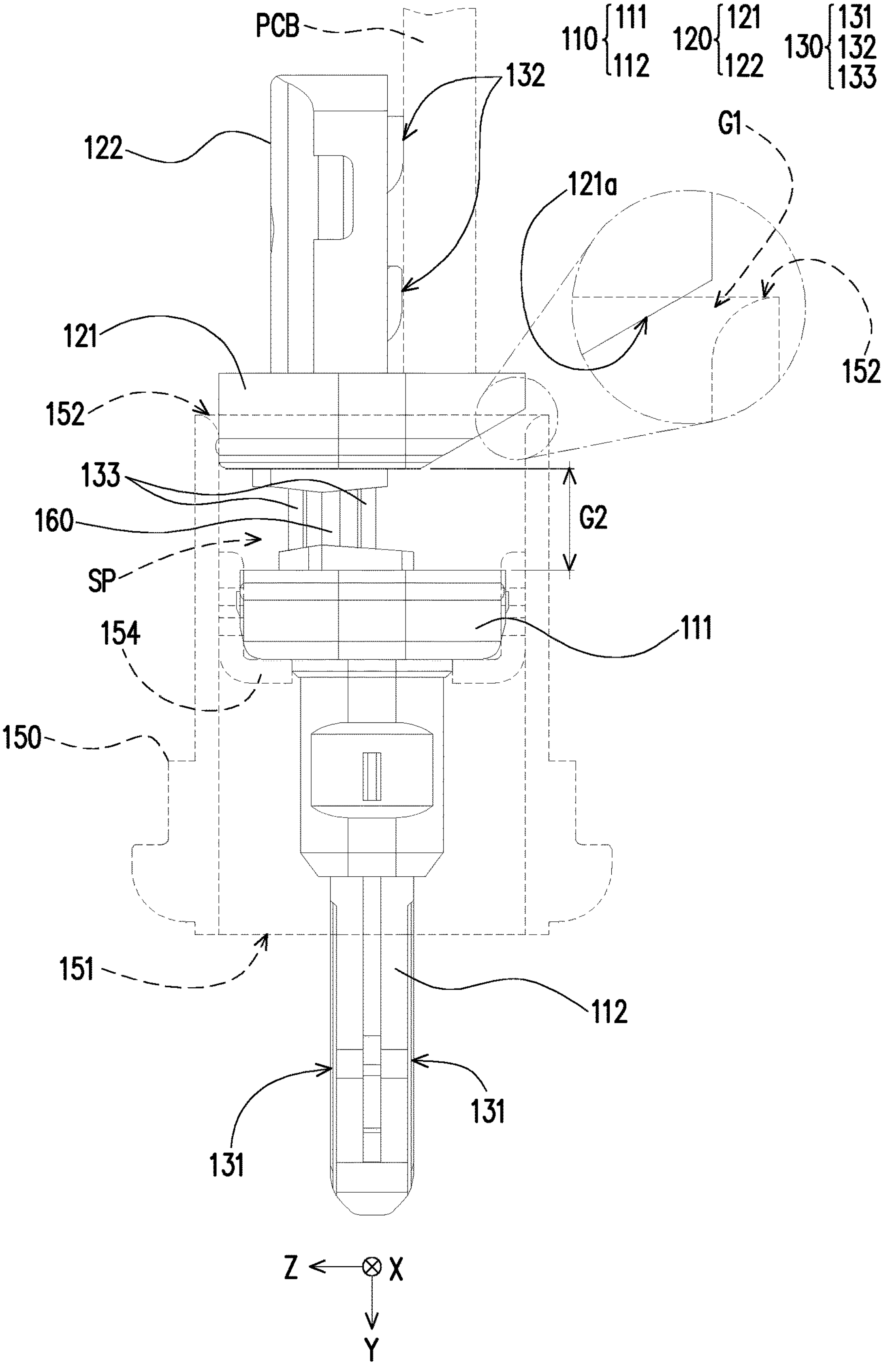
FIG. 4 is a side view of the electrical connector of FIG. 1.

FIG. 4 is a side view of the electrical connector of FIG. 1, and the waterproof member 140 shown in FIG. 1 is omitted here to facilitate the identification of internal structural features formed by the shell 150, the first insulating body 110, and the second insulating body 120. Please refer to FIG. 2 to FIG. 4 at the same time, in the present embodiment, after the shell 150 is sheathed on the first insulating body 110 and the second insulating body 120, the first insulating body 110, the second insulating body 120, and the shell 150 form a space SP, and the space SP is communicated with the external environment via the opening G1. The waterproof member 140 shown in FIG. 1 is filled in the space SP.

Further, the first insulating body 110 is disposed in the shell 150 and located between the front edge 151 and the rear edge 152. At least one of the rear edge 152 and the second insulating body 120 has at least one notch 153 at a portion where the rear edge 152 and the second insulating body 120 are adjacent to each other to form the at least one opening G1. Here, the notch 153 formed by the rear edge 152 of the shell 150 is used as an example. Moreover, the first insulating body 110 has a first base portion 111 and a tongue portion 112, the tongue portion 112 is extended beyond the first base portion 111, and each of the terminals 130 has a contact portion 131, a connection portion 133, and a soldering portion 132. The contact portion 131 and the soldering portion 132 are opposite to each other, wherein the contact portion 131 exposes the first insulating body 110 from the upper and lower surfaces of the tongue portion 112 and is arranged in double rows along the Z-axis in order to facilitate mating with the other electrical connector. The connection portion 133 is connected between the contact portion 131 and the soldering portion 132, wherein a part of connection portion 133 is exposed in the gap G2.

In addition, the first base portion 111 is abutted against the retaining wall 154 in the shell 150, the tongue portion 112 passes through and is protruded beyond the shell 150, and the first base portion 111 is located between the tongue portion 112 and the second insulating body 120.

In contrast, the second insulating body 120 has a second base portion 121 and a tail portion 122, the first base portion 111 and the second base portion 121 maintain the gap or the spacing G2 along the insertion direction, and the second base portion 121 is located between the first base portion 111 and the tail portion 122. The second base portion 121 and the rear edge 152 of the shell 150 are adjacent to each other and the at least one opening G1 is therebetween. As shown in FIG. 2 and FIG. 3, the soldering portion 132 of each of the terminals 130 exposes the second insulating body 120 from the tail portion 122, and is arranged in double rows along the Y-axis. The soldering portion 132 is substantially coplanar (equivalent to being located on the X-Y plane) to facilitate soldering to pads (not shown) on a circuit board PCB.

Moreover, the electrical connector 100 further includes a shielding sheet 160 combined with the first insulating body 110 and the second insulating body 120 together with the terminal 130 via an insert molding technique, wherein the shielding sheet 160 is located between the terminal 130 arranged in double rows, so as to prevent the high-speed signals of the terminal 130 from interfering with each other. Moreover, the shielding sheet 160 has a latching terminal 161 and a grounding terminal 162 opposite to each other, wherein the latching terminal 161 exposes the first insulating body 110 from the tongue portion 112, and the grounding terminal 162 and one row of the soldering portions 132 are in the same row and coplanar, so as to facilitate soldering to the circuit board PCB and provide a grounding effect.

It should be mentioned that, the shielding sheet 160 and a portion of the terminal 130 are exposed between the first insulating body 110 and the second insulating body 120 and located in the space SP. However, since the waterproof member 140 may be fully filled in the space SP and the gap or the spacing G2 so as to enclose the exposed part of each terminal 130, and the waterproof effect between the members may be effectively produced.

It should be mentioned that, the arrangement of the terminal 130 and the shielding sheet 160 is the same as that disclosed in the prior art electrical connector. Therefore, the above-mentioned and unmentioned parts of the present embodiment may be known from the prior art and are not repeated herein.

As shown in FIG. 4, the assembled shell 150, first insulating body 110, and second insulating body 120 form the space SP, and the space SP of the present embodiment is communicated with the external environment via the opening G1, and after the above assembly, the operator may further inject a waterproof adhesive into the space SP via the opening G1. After the waterproof adhesive is cured, the waterproof member 140 is formed. As shown in FIG. 1, since the opening G1 is in the shape of a long strip, sufficient space and position are provided for the operator to inject the adhesive, and also the discharge of the gas in the space SP is facilitated. Furthermore, as shown in FIG. 4, the second base portion 121 of the second insulating body 120 of the present embodiment also has an inclined surface 121*a* inclined from the opening G1 toward the space SP, thus facilitating to provide a guiding effect for the injected waterproof adhesive.

As shown in FIG. 4, the waterproof adhesive filled in the space SP (which becomes the waterproof member 140 after curing) is matched with the first insulating body 110 and the second insulating body 120 separated from each other along the insertion direction. Therefore, a waterproof mechanism may be effectively provided between the shell 150 and the first insulating body 110 and the second insulating body 120, and between the terminal 130 and the first insulating body 110 and the second insulating body 120, in order to achieve the desired waterproof effect from the internal structure of the electrical connector 100.

Moreover, the second base portion 121 is substantially located on the X-Z plane, and the insertion direction (the Y-axis) is the normal of the X-Z plane. The orthographic projection area of the waterproof member 140 on the X-Z plane is less than that of the second base portion 121. Therefore, the waterproof member 140 is in a state of being shielded by the second base portion 121 in the insertion direction. As shown in FIG. 4, when the user looks at the electrical connector 100 along the Y-axis from the circuit board PCB, only the second base portion 121 is seen and the waterproof member 140 is not seen as exposed.

Figure 5:
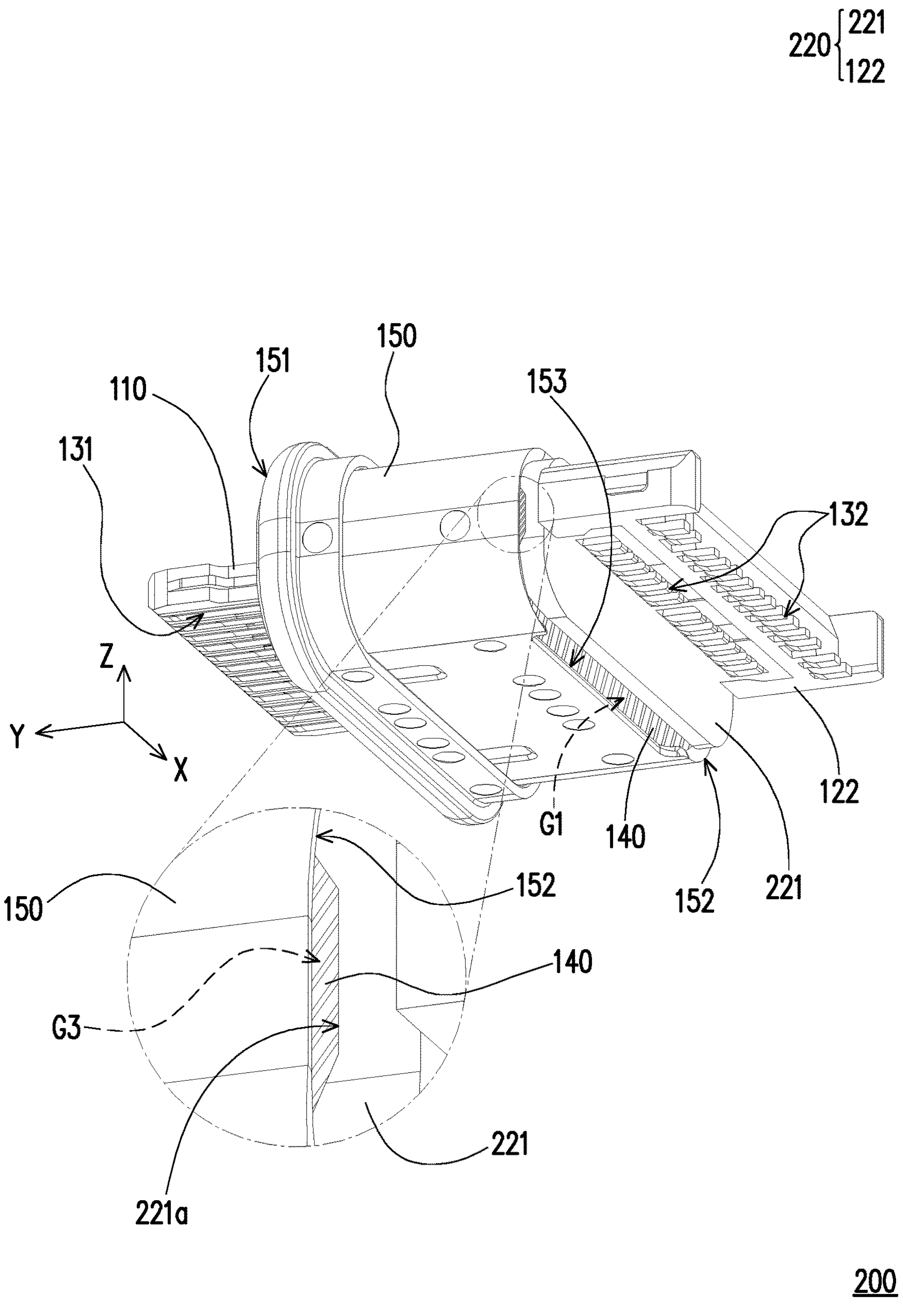
FIG. 5 is a schematic diagram of an electrical connector of another embodiment of the invention.

FIG. 5 is a schematic diagram of an electrical connector of another embodiment of the invention. Please refer to FIG. 5 and compare with FIG. 1. Different from the previous embodiment, in an electrical connector 200 of the present embodiment, in addition to the same opening G1 as the previous embodiments, the second base portion 221 of the second insulating body 220 of the present embodiment also has another notch 221*a* to form another opening G3 with the rear edge 152 of the shell 150. Accordingly, when the operator performs the adhesive filling operation as described above, the opening G1 may be used for adhesive filling, and the opening G3 may be used for exhausting. In FIG. 5, the same reference numerals as the previous embodiment or the same member features as the previous embodiment are described in the previous embodiment, and are not repeated herein.

It may be known from the embodiment shown in FIG. 5 and the embodiment shown in FIG. 1 to FIG. 4 that the quantity and position of the openings are not limited in the present application. That is, one or a plurality of openings G1 (or G3) may be disposed at a portion where the rear edge 152 of the shell 150 and the second base portion 121 (or 221) of the second insulating body 120 (or 220) are adjacent to each other and at a position where the one or a plurality of openings G1 (or G3) are disposed around the insertion direction.

Figure 6:
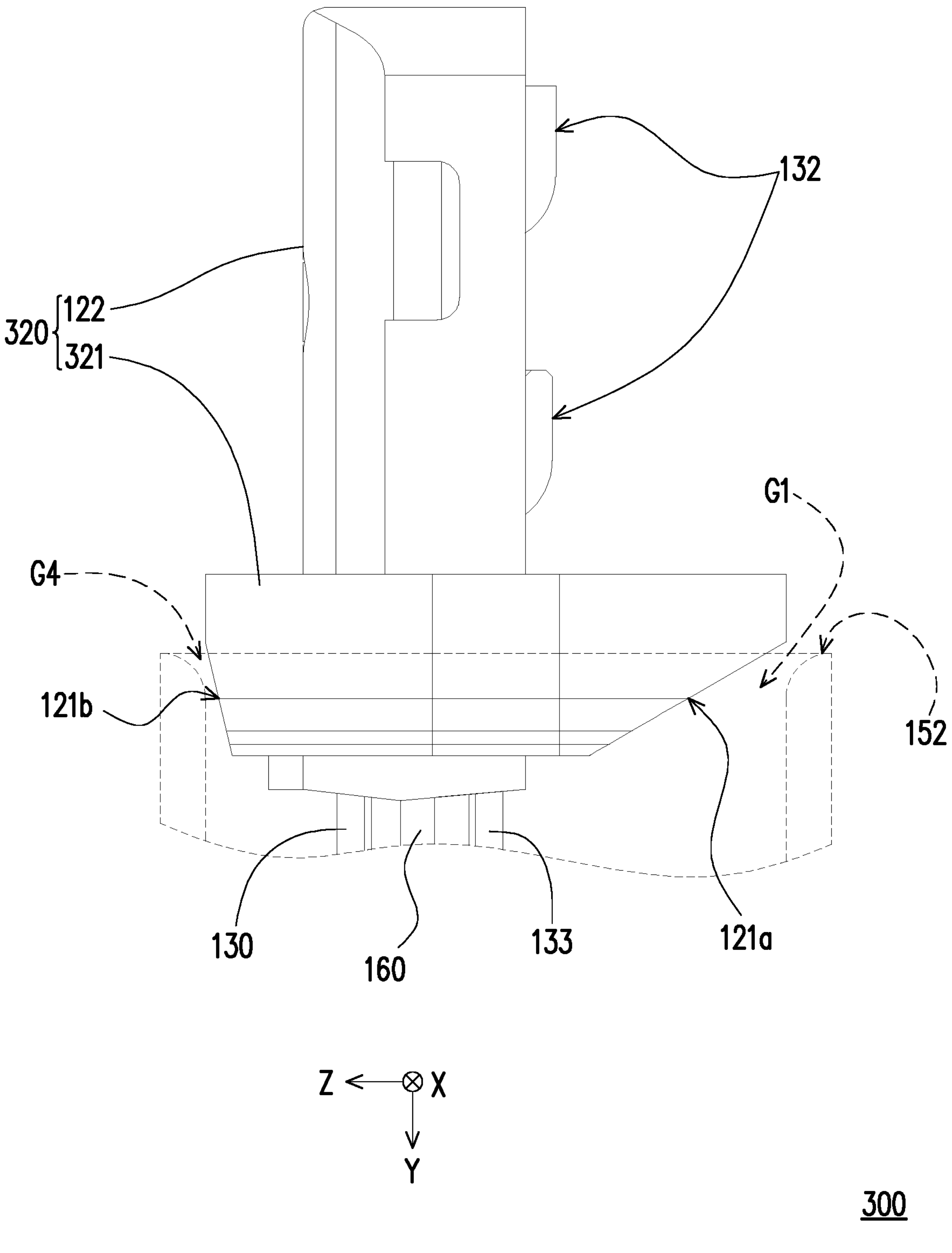
FIG. 6 is a side view of an electrical connector of another embodiment of the invention.

FIG. 6 is a side view of an electrical connector of another embodiment of the invention. Please refer to FIG. 6 and compare with FIG. 4. As mentioned above, the quantity and position of the openings are not limited in the present application. Therefore, in an electrical connector 300 of the present embodiment, in addition to the same opening G1 as in the previous embodiments, the second base portion 321 of the second insulating body 320 of the present embodiment also has another inclined surface 121*b* inclined from another opening G4 toward the space SP, and the inclined surface 121*b* and the opening G4 and the inclined surface 121*a* and the opening G1 are opposite to each other along the Z-axis. Relevant structural features produce the same effects as those of the above embodiments and are not repeated herein.

Based on the above, in the embodiments of the invention, the electrical connector is respectively combined to the terminals via the first insulating body and the second insulating body separated from each other, so as to allow the shell, the first insulating body, and the second insulating body to form the space and allow the second insulating body and the rear edge of the shell to form the opening and further allow the opening to be used to communicate with the space and the external environment when the shell is sheathed on the first insulating body and the second insulating body.

In particular, in different embodiments, desired openings may be formed at the second insulating body and the rear edge of the shell according to the adhesive pouring operation and the exhaust requirements.

In this way, when the waterproof member is filled in the space, it is equivalent to having the waterproof member form a waterproof structure between the shell, the first insulating body, and the second insulating body separated from each other. In addition to the waterproof mechanism between the shell and the first insulating body and the second insulating body, even if there is a gap between the terminals and the insulating bodies for the above reasons, the gap may still be effectively blocked. That is, a perfect waterproof mechanism is provided from the internal structure of the electrical connector.

It will be apparent to those skilled in the art that various modifications and variations may be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An electrical connector, comprising:

a plurality of terminals;

a first insulating body and a second insulating body, wherein the plurality of terminals are respectively retained in the first insulating body and the second insulating body;

a shell sheathed to the first insulating body and the second insulating body, wherein the shell has a front edge and a rear edge opposite to each other along an insertion direction, the front edge is used for mating another electrical connector, at least one opening is formed by the rear edge and the second insulating body, the first insulating body and the second insulating body are separated from each other, a space is formed by the first insulating body, the second insulating body, and the shell, and the space is communicated with an external environment via the at least one opening; and a waterproof member filled into the space, wherein the waterproof member is a waterproof adhesive injected via the at least one opening and filled in the space, wherein the second insulating body has an inclined surface inclined from the at least one opening toward the space to guide the waterproof adhesive injected from the at least one opening to flow toward the space.

2. The electrical connector of claim 1, wherein at least one of the rear edge and the second insulating body has at least one notch at a portion where the rear edge and the second insulating body are adjacent to each other to form the at least one opening.

3. The electrical connector of claim 1, wherein the first insulating body is disposed in the shell and located between the front edge and the rear edge.

4. The electrical connector of claim 1, wherein the first insulating body has a first base portion and a tongue portion, the first base portion is abutted against a retaining wall in the shell, the tongue portion passes through and is protruded beyond the shell, and the first base portion is located between the tongue portion and the second insulating body.

5. The electrical connector of claim 4, wherein the plurality of terminals each have a contact portion for mating with the other electrical connector, and the contact portion respectively exposes on an upper surface and a lower surface of the tongue portion of the first insulating body.

6. The electrical connector of claim 4, wherein the second insulating body has a second base portion and a tail portion, the first base portion and the second base portion maintain a spacing along the insertion direction, and the second base portion is located between the first base portion and the tail portion.

7. The electrical connector of claim 6, wherein each of the plurality of terminals has a soldering portion for soldering on a circuit board, and the soldering portion exposes the second insulating body from the tail portion.

8. The electrical connector of claim 6, wherein the second base portion and the rear edge of the shell are adjacent to each other and the at least one opening is therebetween.

9. The electrical connector of claim 6, wherein the second base portion is seated on a plane, the insertion direction is a normal of the plane, and an orthographic projection area of the waterproof member on the plane is less than that of the second base portion, so that the waterproof member is shielded by the second base portion in the insertion direction.

10. An electrical connector, comprising:

a plurality of terminals;

a first insulating body and a second insulating body, wherein the plurality of terminals are respectively retained in the first insulating body and the second insulating body along an insertion direction, a gap is between the first insulating body and the second insulating body, and a part of each terminal is exposed in the gap;

a shell sheathed to the first insulating body and the second insulating body, wherein the shell has a front edge and a rear edge opposite to each other along the insertion direction, the front edge is used for mating another electrical connector, at least one opening is formed by the rear edge and the second insulating body, the first insulating body and the second insulating body are separated from each other by the gap, a space is formed by the first insulating body, the second insulating body, and the shell, and the space is communicated with an external environment via the at least one opening; and a waterproof member filled into the space and the gap, wherein the waterproof member is a waterproof adhesive injected via the at least one opening and fully filled in the space and the gap to enclose the exposed part of each terminal, wherein the second insulating body has an inclined surface inclined from the at least one opening toward the space to guide the waterproof adhesive injected from the at least one opening to flow toward the space.

11. The electrical connector of claim 10, wherein at least one of the rear edge and the second insulating body has at least one notch at a portion where the rear edge and the second insulating body are adjacent to each other to form the at least one opening.

12. The electrical connector of claim 10, wherein the first insulating body is disposed in the shell and located between the front edge and the rear edge.

13. The electrical connector of claim 10, wherein the first insulating body has a first base portion and a tongue portion, the first base portion is abutted against a retaining wall in the shell, the tongue portion passes through and is protruded beyond the shell, and the first base portion is located between the tongue portion and the second insulating body.

14. The electrical connector of claim 13, wherein the plurality of terminals each have a contact portion for mating with the other electrical connector, and the contact portion respectively exposes on an upper surface and a lower surface of the tongue portion of the first insulating body.

15. The electrical connector of claim 13, wherein the second insulating body has a second base portion and a tail portion, the first base portion and the second base portion maintain the gap along the insertion direction, and the second base portion is located between the first base portion and the tail portion.

16. The electrical connector of claim 15, wherein the second base portion is seated on a plane, the insertion direction is a normal of the plane, and an orthographic projection area of the waterproof member on the plane is less than that of the second base portion, so that the waterproof member is shielded by the second base portion in the insertion direction.

17. An electrical connector, comprising:

a plurality of terminals;

a first insulating body and a second insulating body, wherein the plurality of terminals are respectively retained in the first insulating body and the second insulating body;

a shell sheathed to the first insulating body and the second insulating body, wherein the shell has a front edge and a rear edge opposite to each other along an insertion direction, the front edge is used for mating another electrical connector, at least one opening is formed by the rear edge and the second insulating body, the first insulating body and the second insulating body are separated from each other, a space is formed by the first insulating body, the second insulating body, and the shell, and the space is communicated with an external environment via the at least one opening; and a waterproof member filled into the space, wherein the first insulating body has a first base portion and a tongue portion, the first base portion is abutted against a retaining wall in the shell, the tongue portion passes through and is protruded beyond the shell, and the first base portion is located between the tongue portion and the second insulating body, wherein the second insulating body has a second base portion and a tail portion, the first base portion and the second base portion maintain a spacing along the insertion direction, and the second base portion is located between the first base portion and the tail portion, wherein the second base portion is seated on a plane, the insertion direction is a normal of the plane, and an orthographic projection area of the waterproof member on the plane is less than that of the second base portion, so that the waterproof member is shielded by the second base portion in the insertion direction.

* * * * *